United States Patent [19]

Uenohara et al.

[11] Patent Number: 5,800,270

[45] Date of Patent: Sep. 1, 1998

[54] DAMPER DISC ASSEMBLY HAVING SPRING ENGAGING MEANS WHICH RESTRICT RADIAL MOVEMENT OF CORRESPONDING SPRINGS

[75] Inventors: Norihisa Uenohara, Ibaraki; Hiroshi Mizukami; Shinichi Noda, both of Neyagawa; Masanobu Tanaka, Hirakata, all of Japan

[73] Assignee: Exedy Corporation, Osaka, Japan

[21] Appl. No.: 681,441

[22] Filed: Jul. 23, 1996

[30] Foreign Application Priority Data

Jul. 24, 1995 [JP] Japan ................................. 7-187036
Aug. 29, 1995 [JP] Japan ................................. 7-220121

[51] Int. Cl.[6] ..................................................... F16D 3/52
[52] U.S. Cl. ........................... 464/64; 464/68; 192/205
[58] Field of Search ........................... 464/66, 67, 68, 464/64; 192/203, 205; 74/574

[56] References Cited

U.S. PATENT DOCUMENTS

| | | | |
|---|---|---|---|
| 4,493,408 | 1/1985 | Nagano | 464/68 |
| 4,702,721 | 10/1987 | Lamarche | 464/67 |
| 4,747,801 | 5/1988 | Chasseguet et al. | 464/66 |
| 4,959,039 | 9/1990 | Naudin | 464/66 |
| 5,065,642 | 11/1991 | Kagiyama et al. | 464/68 X |
| 5,218,884 | 6/1993 | Rohrle | 464/68 X |
| 5,380,248 | 1/1995 | Kraus et al. | 464/66 |

FOREIGN PATENT DOCUMENTS

| | | | |
|---|---|---|---|
| 1047955 | 11/1953 | France | 464/66 |
| 353584 | 5/1961 | Switzerland | 464/66 |

*Primary Examiner*—William Stryjewski
*Assistant Examiner*—Gregory J. Strimbu
*Attorney, Agent, or Firm*—Shinjyu Office of Patent Attorney

[57] ABSTRACT

A clutch disc assembly includes a flange having a plurality of window holes formed in a circumferential direction about the flange. A clutch plate and a retaining plate are disposed on either side the flange. The clutch plate and the retaining plate are fixed to each other and include a plurality of window holes corresponding to the window holes of the flange. A plurality of first coil springs are disposed in the window holes of the flange such that each end of the first coil springs are supported in the circumferential direction by the window holes in the retaining plate and the clutch plate. Protrusions are formed on circumferentially opposite ends of the window holes in the flange. The protrusions are configured to engage the first coil spring in response to rotary displacement between the flange and the retaining and clutch plates. Upon engagement between the ends of the first coil spring and the protrusions, the protrusions limit the radial outward movement of the first coil spring. In a second embodiment, the clutch disc assembly includes a spring seat retained within the window hole and which engages the first coil spring to limit radial movement of the first coil spring.

9 Claims, 10 Drawing Sheets

DAMPER DISC ASSEMBLY HAVING SPRING ENGAGING MEANS WHICH RESTRICT RADIAL MOVEMENT OF CORRESPONDING SPRINGS

BACKGROUND OF THE INVENTION

1. Field of the Invention

The present invention relates to a damper disc assembly used for an automotive clutch disc or the like, the damper disc assembly having a plurality of springs, each spring engaged at each axial end by engaging means which restrict radial movement of the springs.

2. Description of the Related Art

A clutch disc assembly used for an automotive clutch includes a clutch plate and a retaining plate as an input side member, a hub flange as an output side member, a coil spring with both ends in the circumferential direction being supported by a window hole of the hub flange and raised portions of the flanges, and a friction generating mechanism for generating friction when the plates and the hub flange rotate relatively to one another. In the clutch disc assembly, two coil springs are disposed in one window hole to act in series in the circumferential direction in order to suppress the twist rigidity of the coil springs to a low level and further to widen the twist angle.

When a clutch disc assembly rotates, a coil spring is moved radially outwardly by the act of centrifugal force. When the coil spring is compressed in such a state, the coil spring slides on the outer circumference of the window hole of the flange, and the raised portions of the clutch plate and the retaining plate. As a result, those members are abraded and are brake some time later, often prematurely.

Especially, in recent years, an automobile is often driven at a high speed state, and the frequency of clutch operation is decreasing, resulting in less abrasion of the friction facing. Thus, in order to prolong the life span of the clutch, it becomes important to decrease the abrasion of the window hole portion of the clutch disc assembly.

SUMMARY OF THE INVENTION

An object of the present invention is to reduce the amount abrasion of between members of a damper disc assembly.

In one aspect of the present invention, a damper disc assembly includes a first disc member formed with a plurality of window holes arranged in a circumferential direction and a pair of second disc members each disposed on opposite sides of the first disc member, the second disc members being fixed to each other and the second disc members being formed with a plurality of engaging portions corresponding to the window holes. A plurality of coil springs are disposed in the window holes between the engaging portions. Opposing ends of each of the coil springs are in contact with corresponding ones of the engaging portions with the first and second disc members in a torsion free state. A limiting portion is formed in at least one of the window holes, the limiting portion being engageable with one end of a corresponding one of the springs in response to relative rotary displacement between the first and second disc members for limiting radial outward movement of the coil springs.

Preferably, each of the window holes is formed with at least one of the limiting portion.

Preferably, the limiting portion contacts a radial inner portion of the coil spring urging the coil spring radially inward in response to relative rotary displacement between the first and second disc members.

Preferably, the limiting portion extends into an inner radial portion of the coil spring in response to relative rotary displacement between the first and second disc members.

Preferably, the limiting portion is a protrusion integrally formed in at least one circumferential end of the window hole in the circumferential direction and extending in the circumferential direction.

Preferably, the protrusion is formed at each opposing circumferential end of the window hole.

When torque is transmitted through the damper disc assembly, the torque is transmitted through the plurality of coil springs. Centrifugal force due to the rotation of the damper disc assembly acts on the coil springs. However, the radial outward movement of the coil spring is limited by the limiting portion formed in the window hole. Consequently, sliding engagement between the coil spring and adjacent members is reduced.

Since the limiting portion is integrally formed at the end of the window hole in the circumferential direction, it can be formed simply and inexpensively.

In another aspect of the present invention, a damper disc assembly includes a first rotary member formed with a window hole, the window hole formed with at least one first recess portion formed at one circumferential end of the window hole, an elastic member disposed in the window hole, a second rotary member disposed adjacent to the first rotary member and including a second recess portion, and a limiting member being retained in at least one circumferential end of the window hole within the first recess portion, the limiting member engaged with the elastic member, the limiting member being at least partially retained in the second recess portions of the second rotary member against radial movement with respect to the first and second rotary members and wherein the limiting member limits radial outward movement of the elastic member.

Preferably, the elastic member is a coil spring, and the limiting member includes an engaging portion which extends into a corresponding one of each of the first and second recess portions and the limiting member also includes an insertion portion which extends into the coil spring.

Preferably, the damper disc assembly also includes a third rotary member disposed adjacent to the first rotary member such that the third rotary member and the second rotary member are on opposite sides of the first rotary member, the third rotary member including a third recess portion into which the limiting portion extends.

Preferably, the first rotary member is a hub having a radially extending flange formed thereon and the window hole is formed in a portion of the radially extending flange.

Preferably, the window hole is formed with the first recess portion at opposing circumferential ends thereof, and the elastic member is disposed in the window hole with one of the limiting portions at each end thereof, each of the limiting portions disposed in a corresponding one of the first recess portions.

Preferably, the damper disc assembly also includes at least one pair of the elastic members, wherein the first rotary member is a hub formed with at least two radially extending flanges, the window hole being defined between the radially extending flanges and both of the elastic members being disposed circumferentially within the window hole. A float body is disposed between the first and second rotary members and configured for limited rotary displacement with respect to both the first and second rotary members, the float body radially extending between each of the elastic members such that each of the elastic members is circumferentially confined between one end of the window hole and the float body.

Preferably, the float body and the radially extending flanges are formed with retaining portions which extend circumferentially, the retaining portions being disposed radially outward from the elastic members.

In another aspect of the invention, a damper disc assembly includes a hub formed with at least two radially extending flange portions, the flange portions defining a window hole extending in a circumferential direction, each of the flange portions formed with a support recess. The damper disc assembly further includes at least one rotary plate member disposed adjacent to the hub configured for limited rotary displacement with respect to the hub, the rotary plate member formed with at least two contact portions. Two coil springs are disposed in the window hole extending in the circumferential direction and a float body radially extends between the coil springs, the float body configured for limited rotary displacement with respect to the hub and the rotary plate member. At least two limiting members are included, one of the limiting members being fitted to one end of one of the coil springs and one of the limiting members fitted to the other of the coil springs, each of the limiting members disposed with the coil springs within the window hole, each limiting member in contact with a corresponding one of the support recess and a corresponding one of the contact portions such that the limiting members are restrained from radial movement.

Preferably, the limiting member is formed with an engaging portion which extends into the support recess and the limiting member is further formed with an insertion portion which extends into an portion of the coil spring.

Preferably, the float body includes a main body portion configured to contact ends of the coil springs, and a retaining portion which extends circumferentially from the main body radially outward from the coil springs.

Preferably, the damper disc assembly further includes a second rotary member disposed between the hub and the rotary member, the float body being fixed to the second rotary member.

In yet another aspect of the present invention, a damper disc assembly includes a first rotary member including a window hole extending in a circumferential direction and a pair of elastic members disposed in the window hole in series in the circumferential direction. Further, a float body is disposed between the elastic members in the window hole, and includes a main body portion and a contact portion in contact with the elastic members. A second rotary member is disposed adjacent to the first rotary member and includes support portions for supporting the pair of elastic members in the circumferential direction.

Preferably, the damper disc assembly includes a third rotary member disposed so as to freely rotate relatively to the first rotary member and the second rotary member and a radial inside end of the float body is fixed to the third rotary member.

Although the centrifugal force is applied to the elastic member, the limiting member limits its radial outward movement. As a result, sliding movement of the elastic member on other members is restricted.

The float body includes the contact portion extending from the main body portion in the axial direction, the elastic member contacts with the float body over the axial direction. According to this structure, deformation such as bending of the elastic member in the axial direction is reduced. As a result, the elastic member does not readily interfere with other members so that the abrasion of those members is reduced.

These and other objects, features, aspects and advantages of the present invention will become more fully apparent from the following detailed description of the present invention when taken in conjunction with the accompanying drawings where like reference numerals denote corresponding parts throughout, in which:

BRIEF DESCRIPTION OF THE DRAWINGS

FIG. 1 is taken along the line I-I looking in the direction of the arrows;

FIG. 5 is taken along the line V—V, looking in the direction of the arrows;

DETAILED DESCRIPTION OF THE INVENTION

FIRST EMBODIMENT

Figure 1:
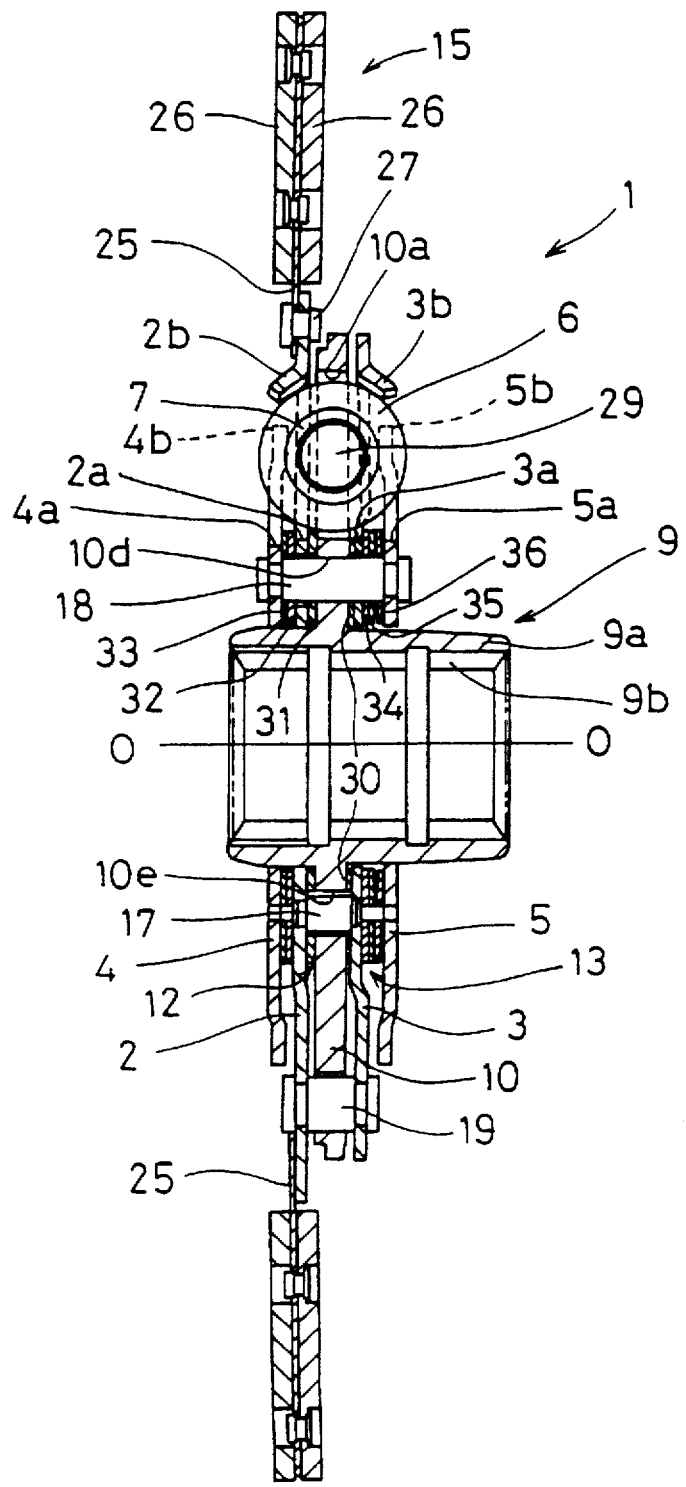
FIG. 1 is a side cross-sectional view showing a clutch disc assembly in accordance with a first embodiment of the present invention.
Figure 2:
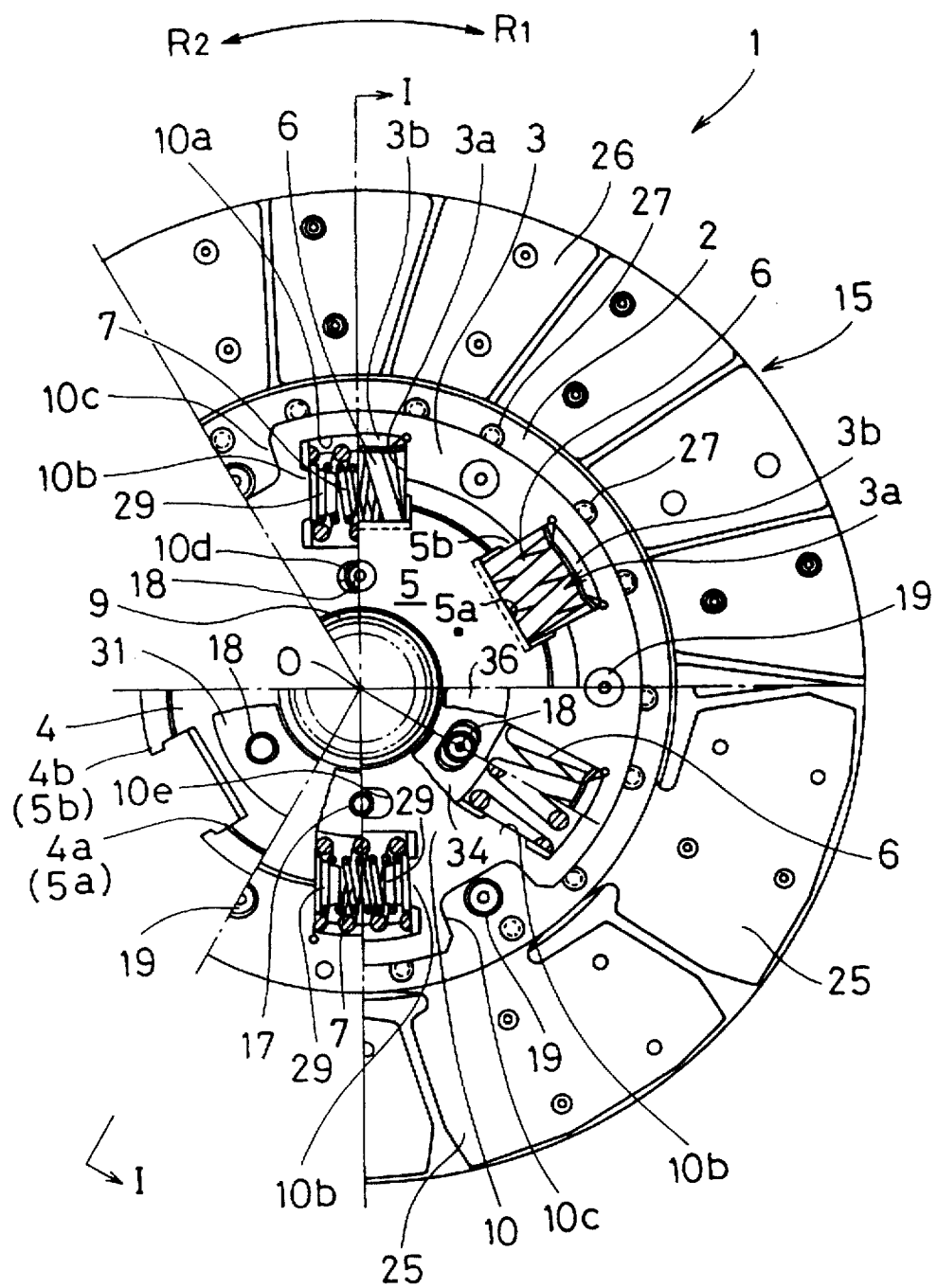
FIG. 2 is a fragmentary, part cutaway plan view showing the clutch disc assembly depicted in FIG. 1 where

FIGS. 1, 2, 3 and 4 show a clutch disc assembly 1 in accordance with a first embodiment of the present invention. The clutch disc assembly 1 is a device for transmitting torque from a flywheel (not shown) disposed at the left in FIG. 1 to a transmission (not shown) disposed at the right in FIG. 1. Hereinafter, the left side of FIG. 1 will be referred to as the engine side and the right side of FIG. 1 will be referred to as the transmission side. Line O—O in FIG. 1 represents a rotation axis of the clutch disc assembly. Arrow R1 shown in FIGS. 2 to 4 denotes a rotation direction of the clutch disc assembly 1.

The clutch disc assembly 1 includes a clutch plate 2 and a retaining plate 3 as an input side member, a first side plate 4 and a second side plate 5 which together serve as an intermediate member, a hub 9, a first coil spring 6 and a second coil spring 7 for coupling respective members in the circumferential direction, a first friction generating mechanism 12, second friction generating mechanism 13, and a friction coupling portion 15.

The clutch plate 2 and the retaining plate 3 are disk-like plate members with center holes, which are disposed at both sides of a flange 10 of the hub 9 while fitted to the boss portion of the hub 9 in a rotatable manner. The clutch plate 2 and the retaining plate 3 are fixed to each other by a first stopper pin 17 at an inner circumference side and by a third stopper pin 19 at an outer circumference side. In the respective plates 2 and 3, six window holes 2a and 3a in total are respectively formed in the circumferential direction with equal intervals. Raised portions 2b and 3b raised in the axial direction are formed at the outside of the window holes 2a and 3a in the radial direction.

Both the first side plate 4 and the second side plate 5 are disk-like plate members and include center holes. Both the plates 4 and 5 have smaller diameters than the diameters of the plates 2 and 3. The center hole of the first side plate 4 is fitted to the hub 9, and is disposed at the engine side of the clutch plate 2. The center hole of the second side plate 5 is fitted to the hub 9 and is disposed on the transmission side of the retaining plate 3. The side plates 4 and 5 are fixed to each other by three second stopper pins 18 at the inner circumference side so that they rotate together as a single structure. In the first side plate 4 and the second side plate 5, cutaways 4a, 5a of the outer circumferential edge are formed at the positions corresponding to the window holes 2a, 3a, and 10a. Protrusions 4b and 5b extending in the circumferential direction extending towards each other are formed at the radial outside edge of the cutaways 4a and 5a. The protrusions 4b and 5b are brought into contact with the spring seat 29 (described below).

The hub 9 includes a boss 9a and the flange 10 integrally formed around the boss 9a. A spline hole 9b engaging with an input shaft (not shown) extending from the transmission side is formed at the center of the boss 9a.

The outer diameter of the flange 10 is about the same or slightly greater than that of the retaining plate 5. Window holes 10a are formed in the flange 10 at six positions corresponding to the window holes 2a and 3a. In the respective window holes 10a, at each circumferential end thereof, protrusions 10b are formed, as shown in greater detail in FIGS. 3 and 4. The protrusions 10b extend in the circumferential direction from radial intermediate portions of each window hole 10a. Within each window hole 10a, the corresponding protrusions 10b extend toward each other. A first coil spring 6 is disposed in the respective window holes 10a. The inner diameter of each first coil spring 6 is longer than the radial width of the protrusion 10b, as is apparent in FIGS. 3 and 4. That is, the first coil spring 6 is movable in the circumferential direction in the window hole 10a, and as the coil spring 6 is compressed, the protrusion 10b is sized to fit into the inside of the coil spring 6. In a torsion free state, each end of the window holes 2a and 3a of the clutch plate 2 and the retaining plate 3 in the circumferential direction are in contact with a corresponding end of the first coil spring 6 in the circumferential direction. As is apparent in FIG. 2, two of the six window holes 10a have both the spring 6 and the second coil springs 7 therein. Four of the six window holes 10a only have the first coil springs 6 disposed therein. The first coil springs 6 and the second coil springs 7 are disposed in the window holes 10a with one spring seat 29 disposed at either ends of the second coil spring 7. In a torsion free state, the spring seat 29 is in contact with the window holes 2a and 3a and the protrusion 10b.

The inner circumference portion of the flange 10 is provided with a short hole 10d in the circumferential direction through which the second stopper pin 18 passes, and a long hole 10e in the circumferential direction through which the first stopper pin 17 passes. In the outer circumferential edge of the flange 10, cutaways 10c of outer circumferential edge are formed at equal spaced apart intervals in the circumferential direction and through which the third stopper pin 19 passes.

The first friction generating mechanism 12 includes a first cone spring 30 disposed between the inner circumference portion of the flange 10 and the inner circumference portion of the retaining plate 3, and a first friction washer 31 disposed between the inner circumference portion of the flange 10 and the inner circumference portion of the clutch plate 2.

The second friction generating mechanism 13 includes a second friction washer 32 and a first friction plate 33 disposed between the inner circumference portions of the clutch plate 2 and the first side plate 4, a third friction washer 34, a second friction plate 35 and a second cone spring 36 disposed between the inner circumference portions of the retaining plate 3 and the second side plate 5.

Holes are formed in the respective washers and plates at the positions corresponding to the first stopper pin 17 and the second stopper pin 18.

The friction coupling portion 15 is fixed to the outer circumference of the clutch plate 2 by a plurality of rivets 27. The friction coupling portion 15 includes a plurality of cushioning plates 25 fixed to the outer circumference portion of the clutch plate 2 by the rivets 27 and ring-like friction facings 26 fixed to both surfaces of the respective cushioning plates 25.

The operation will next be described.

When the friction coupling portion 15 is forced to the engine side, torque from the flywheel of the engine is fed to the clutch disc assembly 1. The torque is transmitted through the clutch plate and the retaining plate 2, 3, the first coil spring 6, the first and second side plates 4, 5, the second coil spring 7, and the hub 9 to a shaft (not shown) of the transmission side.

When twist vibration is transmitted to the clutch disc assembly 1 from the flywheel side, the plates 2, 3 and the hub 9 make periodic relative rotation. At this time, hysteresis arises in the relation between the relative twist angle and the torque.

When the twist vibration with a small shift angle is transmitted from the flywheel (not shown) at the engine side to the clutch disc assembly 1, relative rotation occurs between the plates 2, 3, the first and second side plates 4, 5 and the hub 9. With only a small shift angle of displacement, the second coil spring 7 is compressed in the circumferential direction between the protrusions 4b and 5b of the first and second side plates 4 and 5 and the protrusion 10b of the hub 9. At this time, small friction is generated between the clutch plate 2, the retaining plate 3 and the flange 10 by the first friction generating mechanism 12. The characteristics of the low rigidity and low hysteresis torque at this time attenuates the twist vibration with the small shift angle.

When a twist vibration with a large shift angle is transmitted to the clutch disc assembly 1, the second coil spring 7 is completely compressed so that the second stopper pin 18 for coupling both the side plates 4 and 5 is brought into contact with the circumferential direction short hole 10d formed in the flange 10. As the relative rotation further progresses, six first coil springs 6 are compressed between the plates 2, 3, both the side plates 4, 5, and the flange 10. Here, the second friction generating mechanism 13 generates large friction. According to the high rigidity and high hysteresis torque characteristics at this time, the twist vibration with the large shift angle is effectively attenuated. The relative rotation between the plates 2,3 and the hub 9 is stopped when the first stopper pin 17 and the third stopper pin 19 are respectively brought into contact with the circumferential direction long hole 10e and the outer circumferential edge cutaway 10c.

Figure 4:
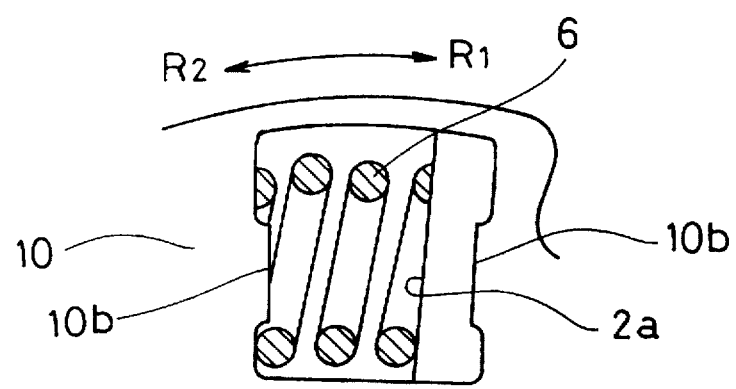
FIG. 4 is similar to FIG. 3 and shows the flange in a state of relative rotary displacement compressing a spring.

In the second stage characteristics where there is a large shift angle of displacement, as described above, when the first coil spring 6 is compressed in the circumferential direction, it typically moves radially outward due to centrifugal forces from the rotation of the clutch disc assembly 1. However, at least one of the protrusions 10b extends into the first coil spring 6 in the compressed state, as is shown in FIG. 4, so that the adjacent coil of the first coil spring 6 is brought into contact with the radial inward portion of the protrusion 10b. As a result, the radial outward movement of the first coil spring 6 is limited, so that contact with the radial outer portion of the window holes 2a and 3a is restricted and thus the abrasion of the respective window holes 2a, 3a, the raised portions 2b, 3b, and the window holes 10a is reduced.

Figure 3:
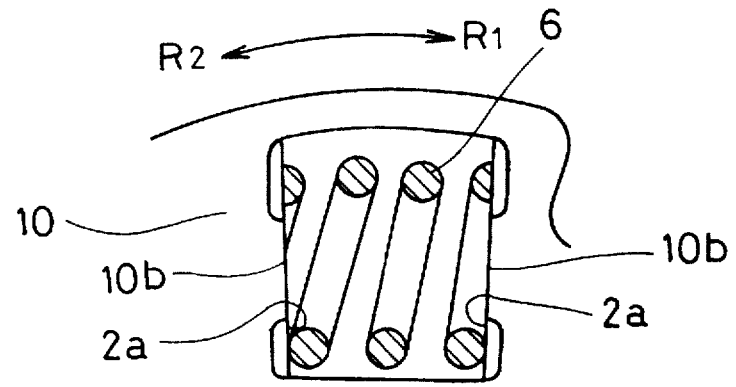
FIG. 3 is a fragmentary, plan view showing a window hole of a flange of the clutch disc assembly depicted in FIGS. 1 and 2.

In a torsion free state where there is no torque applied to the clutch disc assembly 1, the first coil spring 6 does not contact the protrusion 10b, as is shown in FIG. 3. Since the first coil springs 6 are installed in the holes 2a and 3a in a compressed state, there is only the likelihood of small movement of the springs during regular usage of the clutch disc assembly 1. Only during compression of the first coil springs 6 is there an appreciable possibility of abrasion between the springs and adjacent surfaces. In other words, with no twist angle displacement between portions of the clutch disc assembly 1, the first coil springs 6 are not likely to have abrasive contact with the window holes 2a, 3a and the raised portions 2b, 3b. However, over time and regular usage, there may be abrasion between the first coil springs 6 and the window holes 2a and 3a. In this case, as the abrasion progresses, the first coil spring 6 is able to contact the protrusion 10b and other window holes 2a, 3a and the like at the same time. In this state, since the first coil spring 6 is also brought into contact with the protrusion 10b due to wear, the force exerted by the first coil spring 6 to window holes 2a, 3a and the like is lessened. As a result, the abrasion of those portions becomes less.

Since the protrusions 10b are formed in all of the six window holes 10a, it is difficult for the first coil springs 6 to move radially outwardly. That is, in the plates 2, 3, and the flange 10, abrasion occurs at only limited portions thereof, so that the life of the entire of the clutch disc assembly 1 may be extended.

Since the protrusion 10b may become inserted into the first coil spring 6 and can be brought into contact from the outside in the radial direction, a specific space in the radial direction for the protrusion 10b is not required. Further, since the protrusion 10b is integrally formed at the circumferential direction end of the window hole 10a, it can be formed by simple working.

The protrusion 10b is not limited to the shape in the above embodiment if it can limit the radial outward movement of the first coil spring 6. For example, the protrusion 10b may be formed by narrowing the width in the radial direction.

As described above, according to the damper disc assembly of the present invention, the radial outward movement of the coil spring is limited by the limiting portion formed in the window hole of the first disc member. According to this, the coil spring becomes hard to slide on the first disc member and the pair of second disc members so that the abrasion of those members become less.

When the limiting portion is provided in all window holes, all coil springs become hard to move radially outwardly. That is, in the first disc member and the second disc member, the abrasion does not progress, so that the life of the entire of the damper disc assembly becomes long.

When the limiting portion can be brought into contact with the radial inside portion of the coil spring from the outside in the radial direction, the limiting portion does not require a specific space in the radial direction. Since the limiting portion can be inserted in the inside of the coil spring from the circumferential direction, the limiting portion limits the radial outward movement of the coil spring in the state where the coil spring is compressed in the circumferential direction.

When the limiting portion is a protrusion integrally formed at the circumferential direction end of the window hole and extending in the circumferential direction, it can be formed by simple working.

When the protrusion is formed at both the circumferential direction ends of the window holes, in the damper disc assembly, in any case where the first disc member and second disc members are twisted to any side of the circumferential direction, the protrusion is inserted in the coil spring to limit the radial outward movement of the coil spring.

SECOND EMBODIMENT

Figure 5:
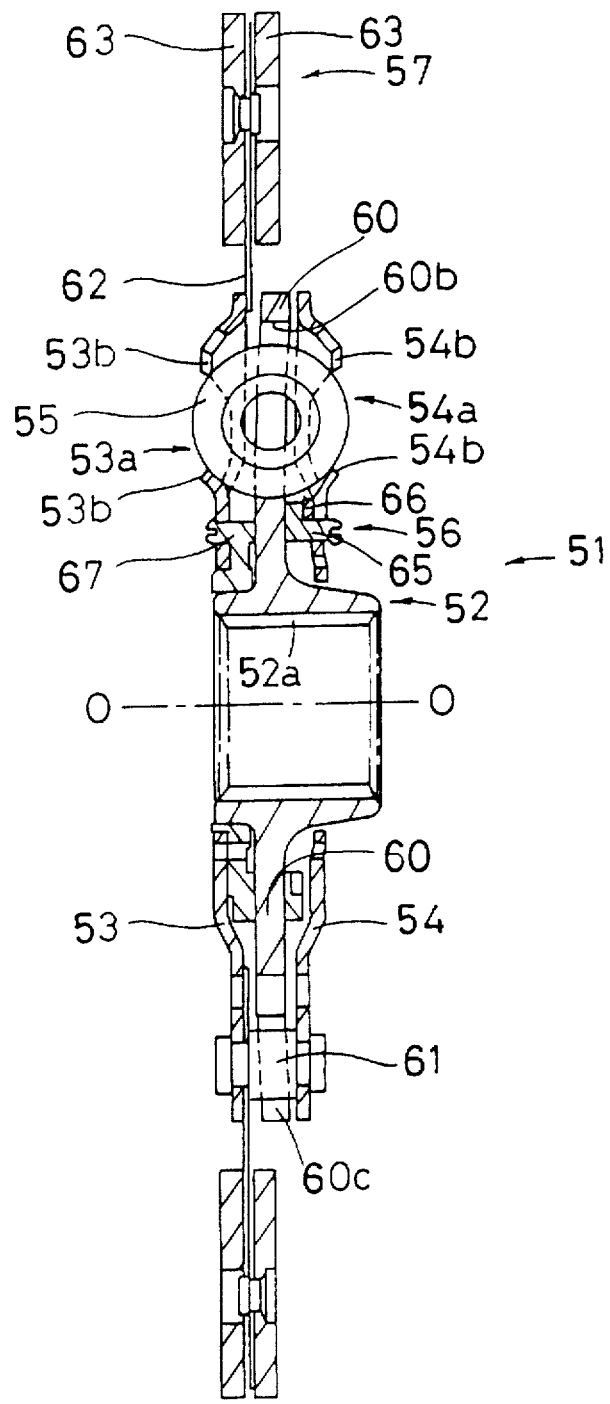
FIG. 5 is a side cross sectional view showing a clutch disc assembly in accordance with a second embodiment of the present invention.
Figure 6:
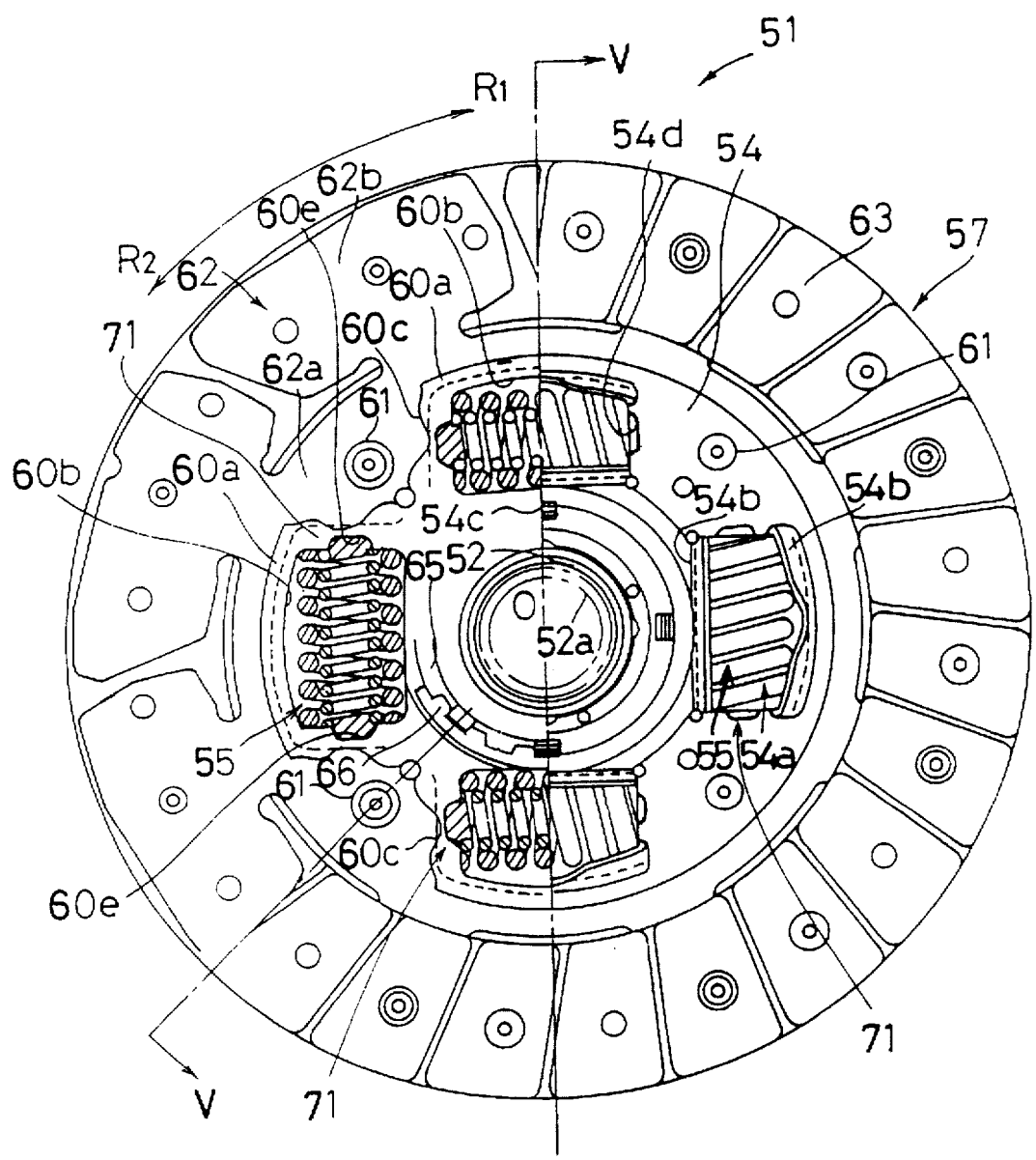
FIG. 6 is a part elevation, part cutaway plan view showing the clutch disc assembly depicted in FIG. 5, where
Figure 7:
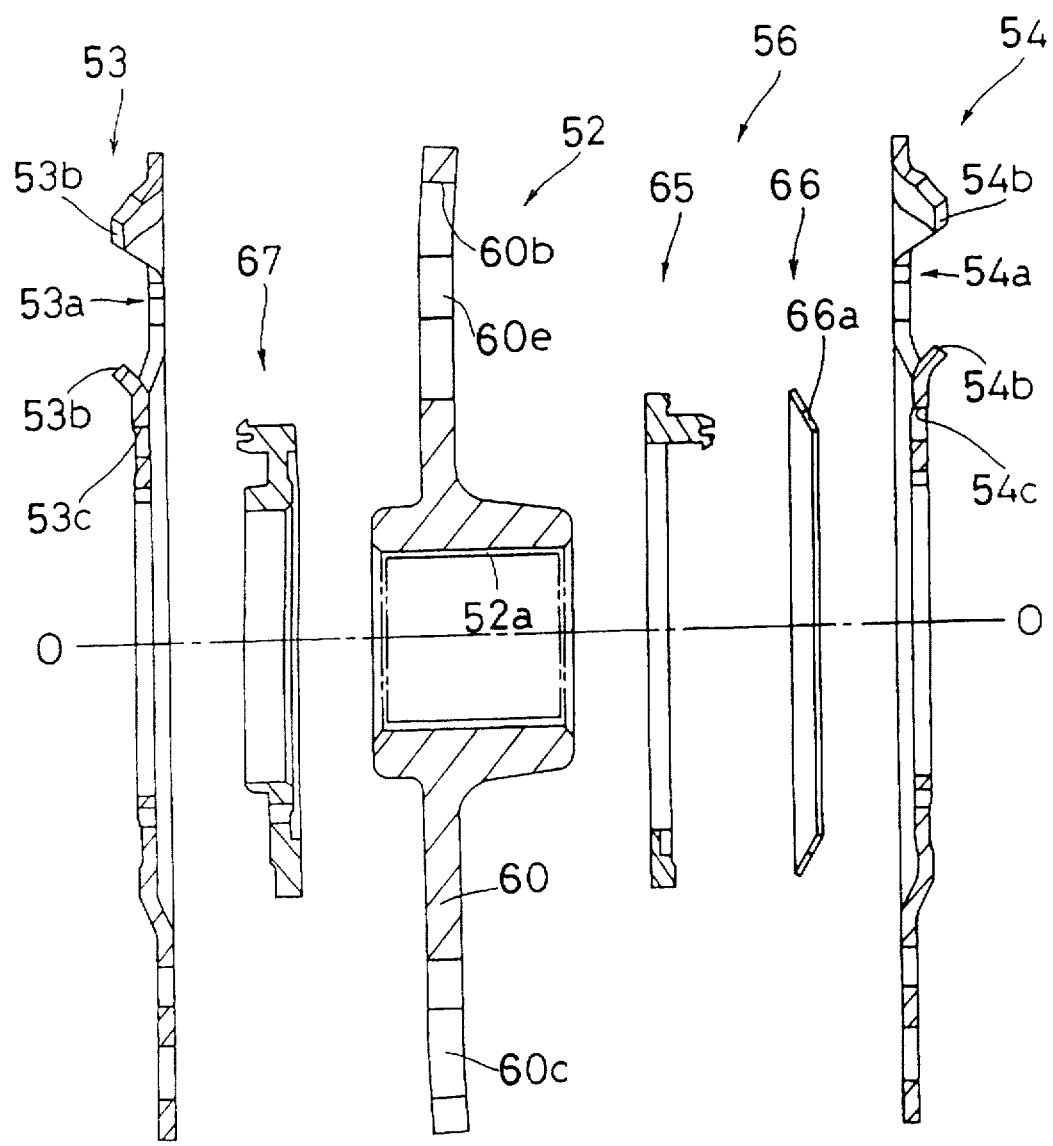
FIG. 7 is an exploded cross sectional view of a portion of the clutch disk assembly depicted in FIGS. 5 and 6.

A clutch disc assembly 51 according to a first embodiment of the present invention as shown in FIGS. 5, 6 7, 8 and 9 is a device for transmitting and interrupting torque from an engine (not shown) disposed at the left side in FIG. 5, to a transmission (not shown) disposed at the right side in FIG. 5. In FIG. 5, line O—O is a rotation axial line of the clutch disc assembly 51.

The clutch disc assembly 51 mainly includes a hub 52 as an output side member, a clutch plate 53 and a retaining plate 54 as an input side member, a coil spring 55 for coupling the hub 52 and the plates 53, 54 in the circumferential direction, and a friction generating mechanism 56 for generating the predetermined friction when relative rotation arises between the plates 53, 54 and the hub 52.

Figure 8:
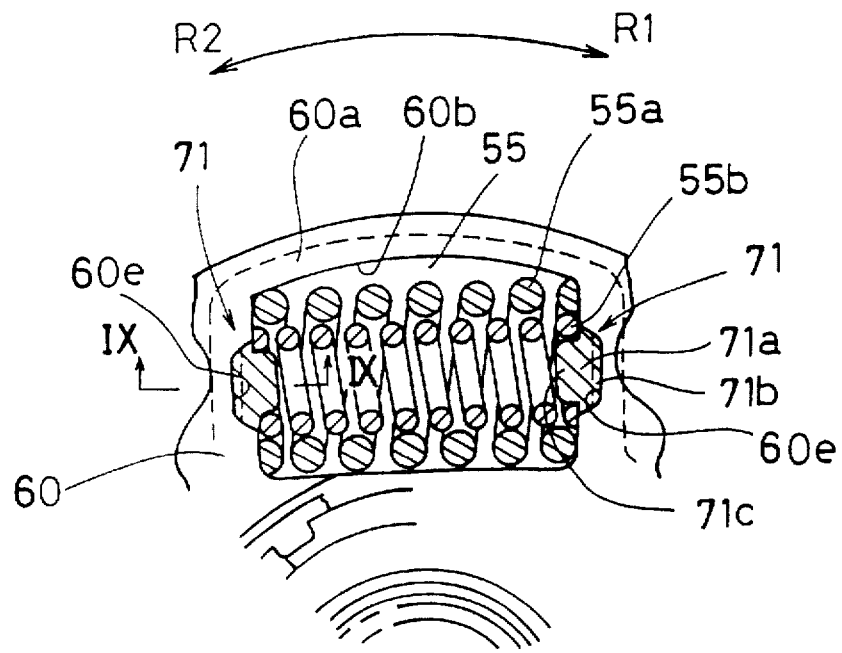
FIG. 8 is a fragmentary, cross sectional view of a portion of the clutch disc assembly depicted in FIG. 6, in a slightly enlarged scale.

The hub 52 is disposed at the center of the clutch disc assembly 51. A spline hole 52a is formed at the inner circumferential side of the hub 52 and is engaged with a shaft (not shown) extending from the transmission side. A flange 60 is integrally formed at the outer circumference of the hub 52. As is apparent from FIG. 6, the flange 60 includes four protrusions 60a between four cutaways 60c cut in the outer circumferential edge. A window hole 60b extending in the circumferential direction is formed in each protrusion 60a. Further, as shown in FIG. 8, engaging recess portions 60e are formed in the window hole 60b at both ends in the circumferential direction and at the radially intermediate portions. The engaging recess portions 60e are cutaways whose width gradually becomes narrow toward the outside in the circumferential direction.

The clutch plate 53 and the retaining plate 54 are a pair of substantially disc-like members each having a center hole, which are rotatably fitted to the outer circumferential side of the hub 52 and are disposed at both sides of the flange 60. The clutch plate 53 and the retaining plate 54 are fixed to each other by four contact pins 61 at the outer circumferential portion. The contact pins 61 pass through the cutaways 60c of the flange 60. Since a predetermined space in the circumferential direction is secured between the contact pin 61 and the end surfaces of the cutaway 60c in the circumferential direction, the plates 53, 54 and the flange 60 can rotate relatively to each other within a predetermined angle.

A friction coupling portion 57 is disposed at the outer circumference of the clutch plate 53. The friction coupling portion 57 is mainly composed of a ring-like cushioning plate 62 and two friction facings 63. The cushioning plate 62 is composed of a ring portion 62a fixed to the clutch plate 53 by the contact pin 61 and a plurality of cushioning portions 62b provided at the outer circumferential side of the ring portion 62a. The friction facings 63 are fixed to both surfaces of the cushioning portion 62b. A flywheel (not shown) on the engine side is disposed on the left side of the friction coupling portion 57 in FIG. 5. When the friction coupling portion 57 is pressed to the side of the flywheel, torque on the engine side is applied to the clutch disc assembly 51.

Figure 9:
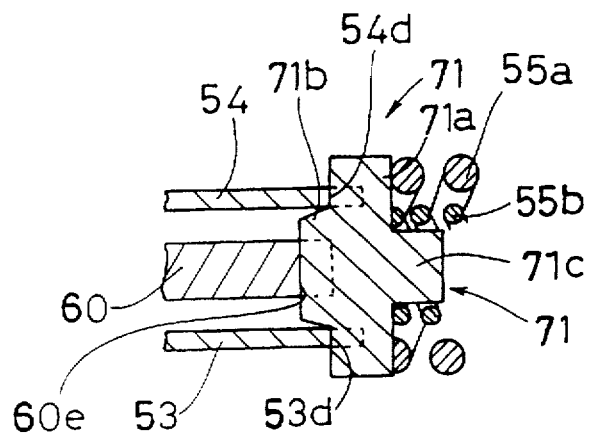
FIG. 9 is a fragmentary cross sectional view taken along line IX—IX in FIG. 8.

Window holes 53a, 54a are respectively formed in the clutch plate 53 and the retaining plate 54 at the positions corresponding to the window hole 60b of the flange 60. The window holes 53a, 54a are formed of raised portions 53b, 54b formed at radially both sides, in which a coil spring 55 is contained. At both the ends of the window holes 53a and 54a in the circumferential direction, as shown in FIG. 9, engaging recess portions 53d and 54d are formed. The width of the engaging recess portions 53d and 54d become narrow toward the outside in the circumferential direction. The engaging recess portions 53d and 54d are shorter than the engaging recess portion 60e in the circumferential direction. In other words, the circumferential distance in between opposing ends of each engaging recess portion 53d and 54d is less than the circumferential distance in between opposing ends of each engaging recess portion 60e. For example, in FIG. 8, the ends of the engaging recess portions 53d and 54d can be seen in phantom extending behind a spring seat 71.

In the second embodiment, there are four coil springs 55 in total, and each is formed from a combination of a large coil spring 55a and a small coil spring 55b. Each end of the coil spring 55 in the circumferential direction are brought into contact with opposing ends of the corresponding window holes 60b, 53a and 54a in the circumferential direction.

The spring seat 71 is disposed within the engaging recess portions 60e, 53d and 54d. As shown in FIGS. 8 and 9, the spring seat 71 is formed with a contact portion 71a, an engaging portion 71b, and an insertion portion 71c. The contact portion 71a extends in the axial direction to be brought into contact with the corresponding ends of the large coil spring 55a and the small coil spring 55b in the circumferential direction. The insertion portion 71c extends from the contact portion 71a, and is inserted in the small coil spring 55b. The engaging portion 71b extends from the contact portion 71a to the side opposite to the insertion portion 71c, and is inserted in the engaging recess portion 60e. The engaging recess portions 53d and 54d of the plates 53 and 54 are respectively engaged with the contact portion 71a of the spring seat 71. In this state, the engaging portion 71b of the spring seat 71 is put between the plates 53 and 54. That is, the spring seat 71 is detachable from the plates 53, 54 and the hub 52 in the circumferential direction, but can not be moved in the radial direction and in the axial direction. However, it should be appreciated that the force of the small coil spring 55b holds the spring seat 71 in place.

Four holes 53c, 54c (FIG. 7) with which a part (described below) of the friction generating mechanism 56 is engaged, are formed in the inner circumferential side of the plates 53 and 54 at an equal interval in the circumferential direction.

The friction generating mechanism 56 includes a first friction member 65, a cone spring 66, and a second friction member 67. The first friction member 65 and the cone spring 66 are disposed between an inner circumferential end of the flange 60 and an inner circumferential end of the retaining plate 54. The first friction member 65 rotates together with the retaining plate 54 and is movable in the axial direction. The cone spring 66 is disposed between the first friction member 65 and the inner circumferential end of the retaining plate 54 in the axial direction. The second friction member 67 can not rotate relatively to the clutch plate 53 but is movable in the axial direction.

The operation of the clutch disc assembly 51 will next be described.

When torque is fed to the clutch disc assembly 51 from a flywheel at the engine side, the torque is transmitted from the friction coupling portion 57 to the plates 53 and 54. The torque is further transmitted to the hub 52 through the coil spring 55, and outputted to a shaft (not shown) of a transmission.

When twist vibration is transmitted to the clutch disc assembly 51, periodic relative rotation arises between the plates 53, 54 and the hub 52. At this time, the coil spring 55 is compressed in the circumference direction, and the first friction member 65 and the second friction member 67 frictionally slide against the flange 60 of the hub 52 so that hysteresis is generated. As a result, the twist vibration is attenuated.

Centrifugal force due to the rotation of the whole of the clutch disc assembly 51 is applied to the large coil spring 55a and the small coil spring 55b. However, the large coil spring 55a and the small coil spring 55b are limited in the radial outward movement by the spring seat 71. For that reason, the large coil spring 55a is not likely undergo sliding contact with the raised portions 53b, 54b and the like.

The function of the spring seat 71 will now be described. For example, it is assumed that the plates 53 and 54 are twisted to the R2 side with respect to the hub 52 from the state shown in FIG. 8. Then, the spring seat 71 in the respective window holes 60b on the R2 side is kept fixed to the side of the engaging recess portion 60e, and the plates 53 and 54 are separated from the spring seat 71 to the R2 side. On the other hand, the spring seat 71 on the R1 side moves to the R2 side together with the plates 53 and 54, and is separated from the engaging recess portion 60e of the flange 60 on the R1 side. In the above state, both the spring seats 71 at the R1 side and the R2 side are engaged with both ends the small coil spring 55b. Further, since the spring seats 71 limit the movement of the small coil spring 55b and the small coil spring 55b extend through the center of the large coil spring 55a, the spring seats 71 also restrict radial movement of the large coil spring 55a.

As described above, since the spring seats 71 is formed to be separable from both the plates 53, 54 and the hub 52 in the circumferential direction, the spring seats 71 are engaged with both ends of the coil springs 55b even when the coil springs 55a and 55b are compressed, which limits the radial outward movement of the coil springs 55a and 55b. As a result, it is difficult for the large coil spring 55a to undergo sliding engagement with the outer circumferential portion of the window hole 60b and the raised portions 53b and 54b of the plates 53 and 54, so that the abrasion of those members becomes less.

THIRD EMBODIMENT

Figure 10:
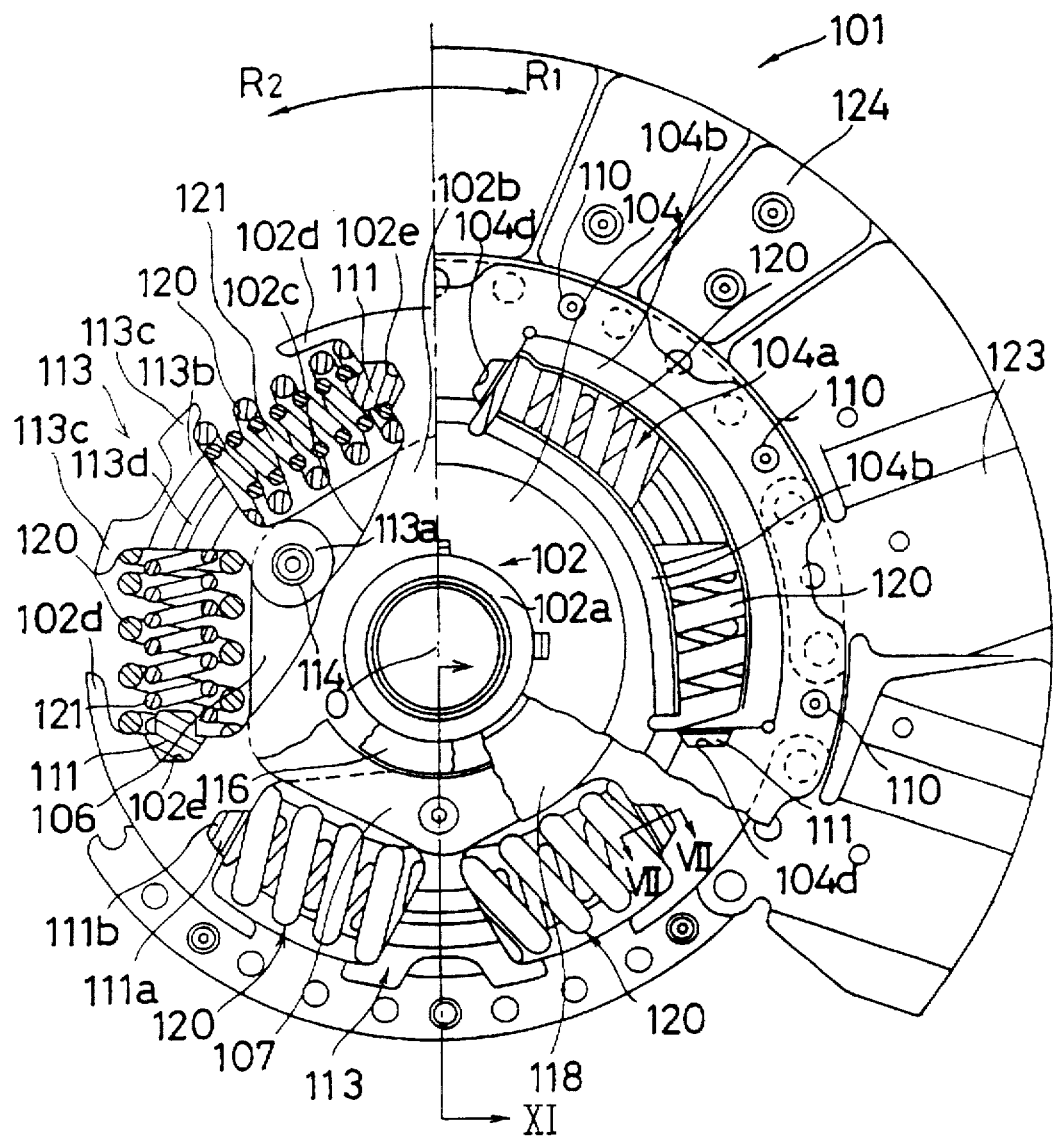
FIG. 10 is a fragmentary, part cutaway, part elevational view showing a clutch disc assembly in accordance with a third embodiment of the present invention.
Figure 11:
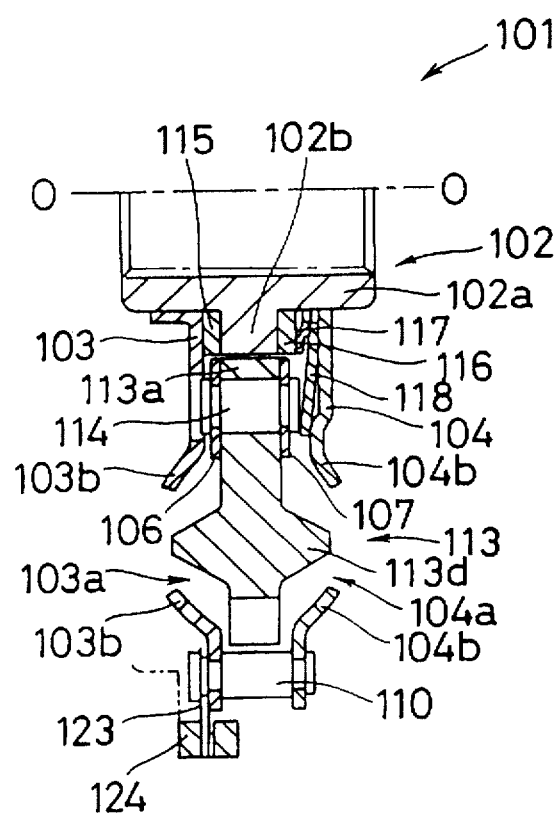
FIG. 11 is a fragmentary cross sectional view taken along line XI—XI FIG. 10.
Figure 12:
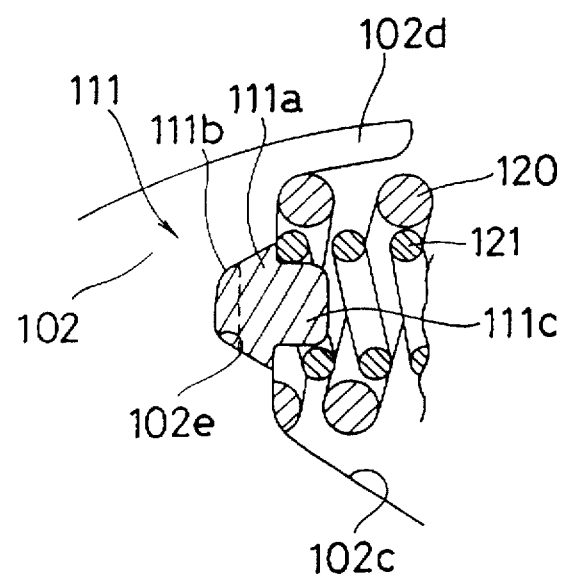
FIG. 12 is a fragmentary, enlarged view of a portion of FIG. 10.

FIGS. 10, 11 and 12 show a clutch disc assembly 101 according to a third embodiment of the present invention. Line O—O in FIG. 11 is a rotation axis of the clutch disc assembly 101.

At the center of the clutch disc assembly 101, a hub 102 coupled with a shaft (not shown) of a transmission is disposed. The hub 102 includes a tubular boss 102a and a flange 102b extending from the boss 102a radially outwardly. At the center of the boss 102a, a spline hole engaged with the shaft of the transmission mentioned above is formed. In the flange 102b, three window holes 102c of cutaways of the radial outside formed lengthwise in the circumferential direction. Flying-out preventing portions 102d are formed at each opposing radially outward end of the respective window holes 102c. Each flying-out preventing portions 102d extends circumferentially toward the center side of the respective window holes 102c in the circumferential direction. Engaging recess portions 102e are formed in the window hole 102c at circumferentially opposing ends in the circumferential direction and at a radially intermediate portion thereof. The engaging recess portions 102e are cutaways whose width becomes gradually narrow toward the outside in the circumferential direction.

A clutch plate 103 and a retaining plate 104 are disposed at both sides of the flange 102b in the axial direction. Both the plates 103 and 104 are disc-like plate members, each having a center hole fitted rotatably around the boss 102a. The clutch plate 103 is disposed at the engine side (left side in FIG. 11) of the flange 102b, and the retaining plate 104 is disposed at the transmission side (right side in FIG. 11) of the flange 102b. The clutch plate 103 and the retaining plate 104 are fixed by a plurality of rivets 110 at the outer circumferential portion. A plurality of cushioning plates 123 are fixed to the clutch plate 103 by the rivets 110. Friction facings 124 are fixed to both surfaces of the cushioning plate 123.

Window holes 103a (FIG. 11) and 104a extending lengthwise in the circumferential direction are formed in the plates 103 and 104 at the portions corresponding to the window holes 102c. Raised portions 103b and 104b raised in the axial direction are formed in the inner circumferential portion and the outer circumferential portion of the respective window holes 103a and 104a. Engaging recess portions 104d are formed at both ends of the respective window holes 103a and 104a in the circumferential direction. The width of the engaging recess portions 103d and 104d becomes narrow toward the outside in the circumferential direction. The engaging recess portions 103d and 104d are shorter than the engaging recess portion 102e in the circumference direction.

A pair of large coil springs 120 is disposed in the space in the respective window holes 102c, 103a, and 104a. Small coil springs 121 are disposed in the respective large coil springs 120. The outside end surfaces of the respective large coil springs 120 and the small coil springs 121 in the circumferential direction are brought into contact with end surfaces of the window hole 102c of the hub 102 in the circumferential direction. A float body 113 is disposed between the coil springs 120 and 121 of the respective window holes. The inside end surfaces of the respective coil springs in the circumferential direction are supported by the float body 113.

As is apparent from FIG. 11, portions of the float body 113 have a substantially triangular shape in cross-section. A rotation coupling portion 113a is provided in the radial inside of the float body 113. The radial inside end of the rotation coupling portion 113a in the diameter direction is fixed to a pair of first sub-plate 106 and second sub-plate 107. The first and second sub-plates 106 and 107 are ring-shaped plate members, disposed at the outer circumference of the flange 102b and fixed to each other by a fixing pin 114.

Both side surfaces of the float body 113 in the circumferential direction are contact surfaces 113b to be brought into contact with the inside surfaces of the respective coil springs 120 and 121 in the circumferential direction. The float body 113 includes jump out preventing portions 113c extending from the triangular portion to both sides in the radial direction. The jump out preventing portions 113c, together with the flying-out preventing portions 102d formed at both sides of the window hole 102c of the hub 102, limit the radial outward movement of the coil springs 120 and 121 and therefore serve as first and second spring retaining portions. Further, the float body includes an axial direction protrusion 113d extending lengthwise in the axial direction. The axial direction protrusion 113d contacts the springs 120 and 121 in the axial direction.

A spring seat 111 is disposed in the engaging recess portions 102e, 103d, and 104d. As shown in FIG. 12 in detail, the spring seat 111 is formed of a contact portion 111a, an engaging portion 111b, and an insertion portion 111c. The contact portion 111a extends lengthwise in the axial direction and is brought into contact with both ends of the large coil spring 120 and the small coil spring 121 in the circumferential direction in a manner similar to engagement between the contact portion 71a of the spring seat 71 and the springs 55a and 55b, as shown in FIG. 9. The insertion portion 111c extends from the contact portion 111a, and inserted in the small coil spring 121. The engaging portion 111b extends from the contact portion 111a to the side opposite to the insertion portion 111c, and is inserted in the engaging recess portion 102e. The engaging recess portions 103d and 104d of the plates 103 and 104 are respectively engaged with the contact portion 111a of the spring seat 111. In this state, the engaging portion 111b of the spring seat 111 is put between the plates 103 and 104. That is, the spring seat 111 is separable from the plates 103, 104 and the flange 102b in the circumferential direction, but can not be moved in the radial direction and the axial direction.

A first friction washer 115 is disposed between an inner circumferential portion of the clutch plate 103 and an inner circumferential portion of the flange 102b. A second friction washer 116, a friction plate 117, and a cone spring 118 from the side of the flange 102b are disposed between the flange 102b and the inner circumferential portion of the retaining plate 104. The second friction washer 116 is brought into contact with the inner circumferential portion of the flange 102b. The friction plate 117 is engaged with the retaining plate 104 so as not to be rotatable relatively. The cone spring 118 is disposed between the friction plate 117 and the retaining plate 104 in the compressed state, which forces the friction plate 117 to the engine side and forces the retaining plate 104 to the transmission side.

The operation will next be described. When the friction facing 124 is pressed to the flywheel by, for example, a pressure plate not shown, torque is transmitted from the plates 103 and 104 through the large coil spring 120 and the small coil spring 121 to the hub 102, and further the torque is outputted from the hub 102 to a shaft (not shown) of a transmission.

When twist vibration is transmitted to the clutch disc assembly 101 from the engine side, the plates 103, 104 and the hub 102 make periodic relative rotation through the large coil spring 120 and the small coil spring 121. At this time, the large coil spring 120 and the small coil spring 121 are compressed, and the first friction washer 115 and the second friction washer 116 frictionally slide between the flange 102b and both of the plates 103, 104. According to this, hysteresis occurs in the relation between the twist angle and the torque, so that the twist vibration is attenuated.

Centrifugal force due to the rotation of the whole of the clutch disc assembly 101 is applied to the large coil spring 120 and the small coil spring 121. However, the large coil spring 120 and the small coil spring 121 are limited in the radial outward movement by the spring seat 111. For that reason, sliding movement between the large coil spring 120 and the raised portions 103b, 104b and the like is limited thus reducing wear therebetween.

The function of the spring seat 111 will be described more specifically. For example, it is assumed that the plates 103 and 104 are twisted to the R2 side with respect to the hub 102 from the state shown in FIG. 10. Then, the spring seat 111 on the R2 side in the respective window holes 102c is kept fixed to the R2 side, and the plates 103 and 104 are separated from the spring seat 111 to the R2 side. In this state, the large coil spring 120 and the small coil spring 121 at the R2 side are engaged with the spring seat on the R2 side. On the other hand, the spring seat 111 at the R1 side, together with the plates 103 and 104, moves to the R2 side, and separated from the engaging recess portion 102e of the flange 102b on the R1 side. In this state, the spring seat 111 on the R1 side is engaged with the large coil spring 120 and the small coil spring 121 on the R1 side. As described above, since the spring seat 111 is formed so as to be separable from the plates 103, 104 and the flange 102b in the circumferential direction, which limits the radial outward movement of the coil springs at both sides. As a result, the large coil spring 7 is unlikely to undergo appreciable sliding contact with the raised portions 103b and 104b of the plates 103 and 104. Consequently, the abrasive contact between those members is reduced compared to prior art configurations.

Further, since the axial direction protrusion 113d is formed in the float body 113, the large coil spring 120 is supported by the float body 113 over the axial direction. This lessens the deformation such as bending of the large coil spring 120 in the axial direction at the compression. As a result, the likelihood that the large coil spring 120 will interfere with other members is reduced, thus reducing the likelihood os abrasive contact between those members.

As described above, in the damper disc assembly of the present invention, when the first rotary member and the second rotary member make relative rotation, both ends of the elastic member in the circumferential direction are always engaged with the limiting member so that the radial outward movement is limited. As a result, the elastic member is less likely to slide on other members such as the first rotary member and the second rotary member, so that the abrasion between those members is reduced.

In the damper disc assembly in which a pair of elastic members are disposed in series in one window hole, when the first rotary member and the second rotary member make relative rotation, the outside ends of the pair of elastic members in the circumferential direction are always brought into contact with the limiting member, so that the radial outward movement is limited. As a result, the pair of elastic members is less likely to slide on other members such as the first rotary member and the second rotary member, so that the abrasion between those members is reduced.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A damper disc assembly, comprising:
    a first rotary member formed with a first window hole, said first window hole formed with at least one first recess portion formed at one circumferential end of said first window hole, said circumferential end defining first elastic member engaging portions on either radial side of said first recess portion;
    an elastic member disposed in said first window hole;
    a pair of second rotary members disposed on opposing axial sides of said first rotary member each of said second rotary members having a second window hole and a second recess portion formed at one circumferential end of each of said second window holes, said circumferential end of each of said second window holes defining second elastic member engaging portions on either radial side of said second recess portion; and
    a limiting member being retained in an axial direction by said pair of second rotary members, said limiting member being retained in radial directions by said first recess portion and said second recess portions, said limiting member engaged with a central portion of one end of said elastic member, a peripheral portion of said end of said elastic member engaging said first and second elastic member engaging portions, and wherein said limiting member limits radial outward movement of said elastic member.

2. The damper disc assembly as in claim 1,
    wherein said elastic member is a coil spring, and
    said limiting member includes an engaging portion which extends into a corresponding one of each of said first and second recess portions and said limiting member also includes an insertion portion which extends into said coil spring.

3. The damper disc assembly as in claim 2, wherein said first rotary member is a hub having a radially extending flange formed thereon and said first window hole is formed in a portion of said radially extending flange.

4. The damper disc assembly as in claim 2, wherein said first window hole is formed with said first recess portion at opposing circumferential ends of said first window hole, and said elastic member is disposed in said first window hole with one of said limiting portions at each end, each of said limiting portions disposed in a corresponding one of said first recess portions.

5. The damper disc assembly as in claim 2, further comprising:
    at least one pair of said coil springs, wherein said first rotary member is a hub formed with at least two radially extending flanges, said first window hole being defined between said radially extending flanges and both of said coil springs being disposed circumferentially within said first window hole;
    a float body disposed between said first and second rotary members and configured for limited rotary displacement with respect to both said first and second rotary members, said float body radially extending between each of said two circumferentially adjacent pairs of said coil springs such that each of said two circumferentially adjacent pairs of said coil springs is circumferentially confined between one end of said window hole and said float body.

6. The damper disc assembly as in claim 5, wherein said float body and said radially extending flanges are formed with retaining portions which extend circumferentially, said retaining portions being disposed radially outward from said coil springs.

7. A damper disc assembly, comprising:

a hub formed with at least two radially extending flange portions, said flange portions defining a first window hole extending in a circumferential direction, each of said flange portions formed with a support recess and spring contact portions on either side of said support recess;

a pair or rotary plate members disposed adjacent to said hub on either side of said hub, said pair of rotary plate members being configured for limited rotary displacement with respect to said hub, said rotary plate members formed with second window holes, each of said second window holes having at least two opposing contact portions;

first and second coil springs, said first and second coil springs being circumferentially adjacent to one another and being disposed in said first and second window holes and extending in the circumferential direction with respect to said hub, wherein a first end of said first coil spring contacts said spring contact portions formed on a first circumferential end of said first window hole and a first end of said second coil spring contacts said spring contact portions on a second circumferential end of said first window hole;

a float body radially extending between a second end of said first coil spring and a second end of said second coil spring such that said second end of said first coil spring contacts said float body and said second end of said second coil spring contacts said float body, said float body configured for limited rotary displacement with respect to said hub and said rotary plate members;

at least two limiting members, one of said limiting members fitted to said first end of said first coil spring and one of said limiting members fitted to said first end of said second coil spring, each of said limiting members disposed with said first and second circumferentially adjacent coil springs within said first window hole, each limiting member in contact with a corresponding one of said support recess and a corresponding one of said second window hole contact portions such that said limiting members are restrained from radial movement by said support recesses and said limiting members are restrained from axial movement with respect to said hub by said pair of said rotary plate members.

8. The damper disc assembly as in claim 7, wherein each of said limiting members is formed with an engaging portion which extends into said support recess and said limiting members are further formed with an insertion portion which extends into a portion of a corresponding one of said coil springs.

9. The damper disc assembly as in claim 7, further comprising a second rotary member disposed between said hub and one of said rotary plate members, said float body being fixed to said second rotary member.

* * * * *